(12) United States Patent
Li et al.

(10) Patent No.: US 7,880,971 B2
(45) Date of Patent: Feb. 1, 2011

(54) LIGHT-COLLIMATING FILM

(75) Inventors: Ching-Shiang Li, Hsin-Chu (TW);
Tzeng-Ke Shiau, Hsin-Chu (TW)

(73) Assignee: Coretronic Corporation, Hsinchu (TW)

( * ) Notice: Subject to any disclaimer, the term of this patent is extended or adjusted under 35 U.S.C. 154(b) by 223 days.

(21) Appl. No.: 12/344,141

(22) Filed: Dec. 24, 2008

(65) Prior Publication Data

US 2009/0180196 A1 Jul. 16, 2009

(30) Foreign Application Priority Data

Jan. 16, 2008 (TW) .............................. 97101579 A

(51) Int. Cl.
*G02B 27/30* (2006.01)
*G02B 27/10* (2006.01)

(52) U.S. Cl. ...................... 359/641; 359/620

(58) Field of Classification Search ................ 359/641, 359/619–622, 708, 712, 718; 349/114, 95, 349/61, 62; 362/31, 330
See application file for complete search history.

(56) References Cited

U.S. PATENT DOCUMENTS

| 5,204,160 | A | 4/1993 | Rouser | 428/167 |
| 6,752,505 | B2 | 6/2004 | Parker et al. | 362/31 |
| 7,345,824 | B2 * | 3/2008 | Lubart et al. | 359/641 |
| 7,518,801 | B2 * | 4/2009 | Davis et al. | 359/620 |
| 7,595,934 | B2 * | 9/2009 | Lubart et al. | 359/641 |

* cited by examiner

*Primary Examiner*—Mohammed Hasan
(74) *Attorney, Agent, or Firm*—Muncy, Geissler, Olds & Lowe, PLLC

(57) ABSTRACT

A light-collimating film includes a transparent substrate, multiple reflective elements, and multiple micro structures. The transparent substrate has a light incident surface and a light-emitting surface opposite the light incident surface. The reflective elements are formed on the light incident surface, wherein each two adjacent reflective elements define a longitudinal aperture. The micro structures are arranged on the light-emitting surface in a direction parallel to longitudinal axes of the longitudinal apertures and overlap the longitudinal apertures to form multiple rows of micro structures. The micro structures include a first side portion to deflect a first light beam incident thereon toward a first virtual central plane of the micro structure which equally divides the micro structure, and a second side portion to deflect a second light beam incident thereon toward a second virtual central plane of the micro structure which is substantially perpendicular to the longitudinal axis of the longitudinal aperture.

22 Claims, 11 Drawing Sheets

LIGHT-COLLIMATING FILM

CROSS REFERENCE TO RELATED APPLICATION

This application claims priority of application No. 097101579 filed in Taiwan R.O.C on Jan. 16, 2008 under 35 U.S.C. §119; the entire contents of which are hereby incorporated by reference.

BACKGROUND OF THE INVENTION

1. Field of the Invention

The invention relates to a light-collimating film having excellent collimation effect and brightness performance.

2. Description of the Related Art

FIG. 1 shows a schematic diagram illustrating a conventional optical film 100 having light-collimating effect, and FIG. 2 shows an enlarged cross-section cut along line A-A' of FIG. 1. Referring to FIG. 1, the optical film 100 includes a transparent substrate 102, a plurality of reflective elements 104, and a plurality of lenticular lenses 106. The transparent substrate 102 has a light incident surface 102a and a light-emitting surface 102b opposite the light incident surface 102a. A plurality of reflective elements 104 are formed on the light incident surface 102 and a longitudinal aperture 108 is defined on the light incident surface 102 by each two adjacent reflective elements 104. A plurality of lenticular lenses 106 are formed on the light-emitting surface 102b, and each of the lenticular lens 106 extends in a direction parallel to the longitudinal direction of the longitudinal aperture 108 to spread on the entire light-emitting surface 102b. Referring to FIG. 2, when emitting light beams of a backlight source (not shown) are incident on the optical film 100 at different angles, some incident light beam (such as S1) having a comparatively large incident angle is reflected by the reflective elements 104 and then returns to the backlight source to be recycled, and some incident light beams (such as S2 and S3) that pass through the longitudinal aperture 108 are deflected by the lenticular lenses 106 to propagate at an on-axis viewing direction (normal direction of the optical film 100).

However, though the above design enables most of the incident light beams to emit from the optical film 100 at an on-axis viewing direction, there is still much room to improve the collimation effect and brightness performance.

BRIEF SUMMARY OF THE INVENTION

The invention provides a light-collimating film having excellent collimation effect and brightness performance.

According to an embodiment of the present invention, a light-collimating film includes a transparent substrate, a plurality of reflective elements, and a plurality of micro structures. The transparent substrate has a light incident surface and a light-emitting surface opposite the light incident surface. The reflective elements are formed on the light incident surface, wherein each two adjacent reflective elements define a longitudinal aperture, and the longitudinal axes of the longitudinal apertures are parallel to each other. The micro structures are arranged on the light-emitting surface in a direction parallel to the longitudinal axes of the longitudinal apertures and overlap the longitudinal apertures to form a plurality of rows of micro structures. Each of the micro structures includes a first side portion that is allowed to deflect a first light beam incident thereon toward a first virtual central plane of the micro structure which equally divides the micro structure, and a second side portion that is allowed to deflect a second light beam incident thereon toward a second virtual central plane of the micro structure, with the second virtual central plane being substantially perpendicular to the longitudinal axis of the longitudinal aperture.

In one embodiment, the first side portion includes a cylindrical side surface extending parallel to the longitudinal axis, and the second side portion includes a first and a second inclined planes that are connected with two sides of the cylindrical side surface and lean toward the second virtual central plane.

In one embodiment, the first side portion includes a first and a second inclined planes that face to each other and lean toward the first virtual central plane, and the second side portion includes a third and a fourth inclined planes that face to each other and lean toward the second virtual central plane.

In one embodiment, the first side portion includes a first and a second curved surfaces that face to each other and lean toward the first virtual central plane, and the second side portion includes a third and a fourth curved surfaces that face to each other and lean toward the second virtual central plane.

According to another embodiment of the present invention, a light-collimating film includes a transparent substrate, a plurality of reflective elements, and a plurality of first and second micro structures. The transparent substrate has a light incident surface and a light-emitting surface opposite the light incident surface. The reflective elements are formed on the light incident surface, wherein each two adjacent reflective elements define a longitudinal aperture, and the longitudinal axes of the longitudinal apertures are parallel to each other. The first micro structures are arranged on the light-emitting surface in a direction parallel to the longitudinal axes of the longitudinal apertures and overlap the longitudinal apertures to form a plurality of rows of first micro structures. Each of the first micro structures includes a first side portion that is allowed to deflect a first light beam incident thereon toward a first virtual central plane of the first micro structure which equally divides the first micro structure, and a second side portion that is allowed to deflect a second light beam incident thereon toward a second virtual central plane of the micro structure, with the second virtual central plane being substantially perpendicular to the longitudinal axis of the longitudinal aperture. The second micro structures are different to the first micro structures in shape. Each of the second micro structures is arranged between two first micro structures and includes a third side portion that is allowed to deflect a third light beam incident thereon toward a third virtual central plane of the second micro structure which equally divides the second micro structure, and a fourth side portion that is allowed to deflect a fourth light beam incident thereon toward a fourth virtual central plane of the second micro structure, with the fourth virtual central plane being substantially perpendicular to the longitudinal axis of the longitudinal aperture.

In one embodiment, the second micro structures are arranged on the light-emitting surface in a direction parallel to the longitudinal axes of the longitudinal apertures and overlap the longitudinal apertures to form a plurality of rows of second micro structures, and at least one row of second micro structures is positioned between two adjacent rows of first micro structures.

In one embodiment, each of the second micro structures is positioned between two first micro structures of one of the rows of first micro structures, and the second micro structures are formed on the light-emitting surface and overlap the longitudinal apertures. The second micro structures are arranged on the light-emitting surface to form a plurality of rows that substantially perpendicular to the longitudinal axes of the longitudinal apertures or are irregularly arranged on the light-emitting surface.

According to the above embodiments, since an azimuth difference of certain degrees exists between the orientation of a first side portion and the orientation of a second side portion, the light-emitting angle of the light-collimating film is narrowed in both directions that are perpendicular to each other as the light beams are deflected by the first and the second side portions. Under the circumstance, the collimation effect and brightness performance of the light-collimating film are considerably enhanced.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and variations thereof herein are used broadly and encompass direct and indirect connections, couplings, and mountings. Similarly, "adjacent to" and variations thereof herein are used broadly and encompass directly and indirectly "adjacent to". Therefore, the description of "A" component "adjacent to" "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
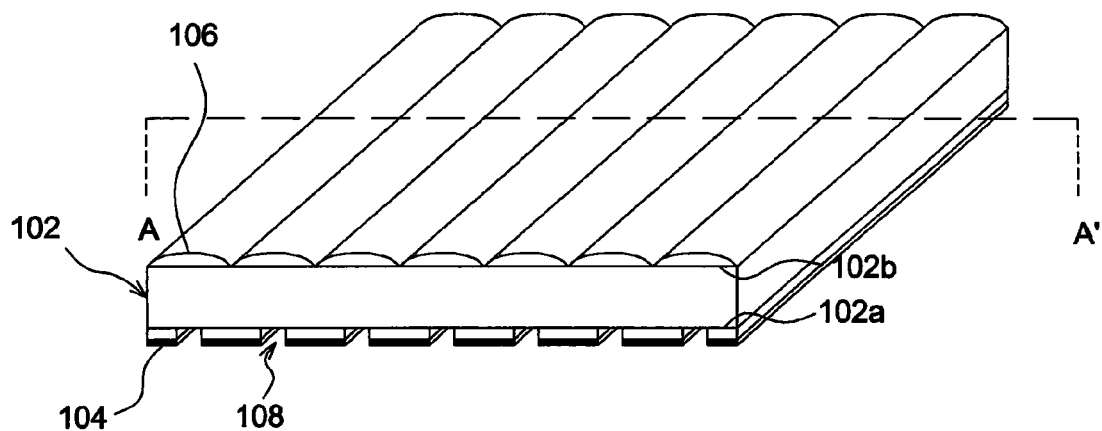
FIG. 1 shows a schematic diagram illustrating a conventional optical film having light-collimating effect.
Figure 2:
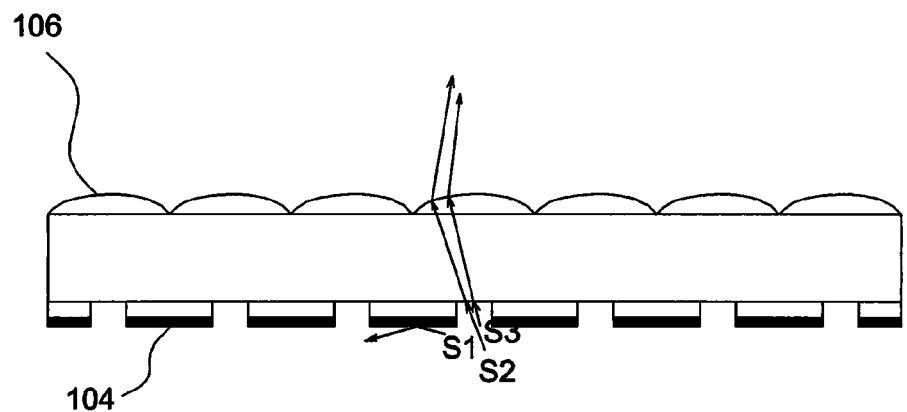
FIG. 2 shows an enlarged cross-section cut along line A-A' of FIG. 1.
Figure 3:
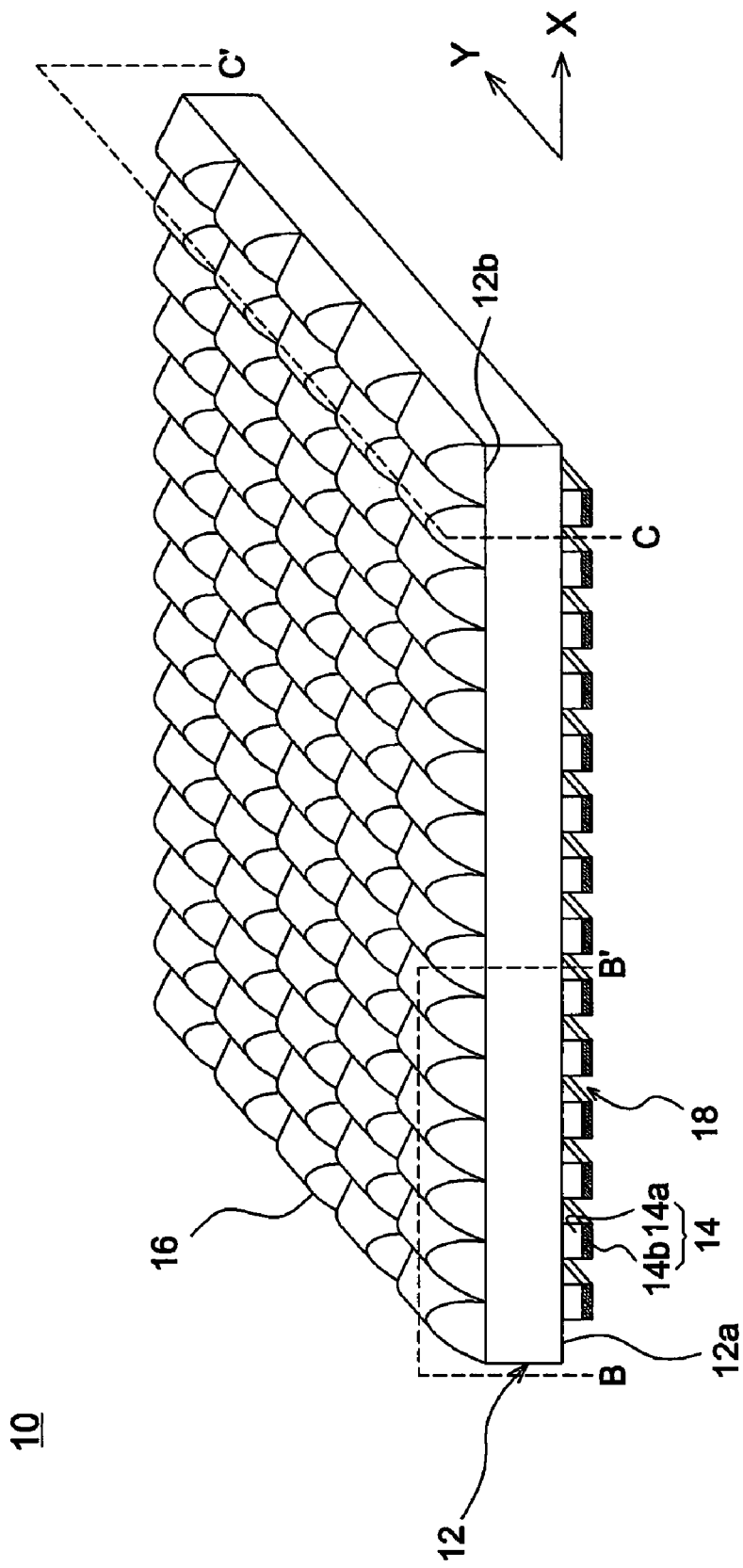
FIG. 3 shows a schematic diagram illustrating a light-collimating film.
Figure 4:
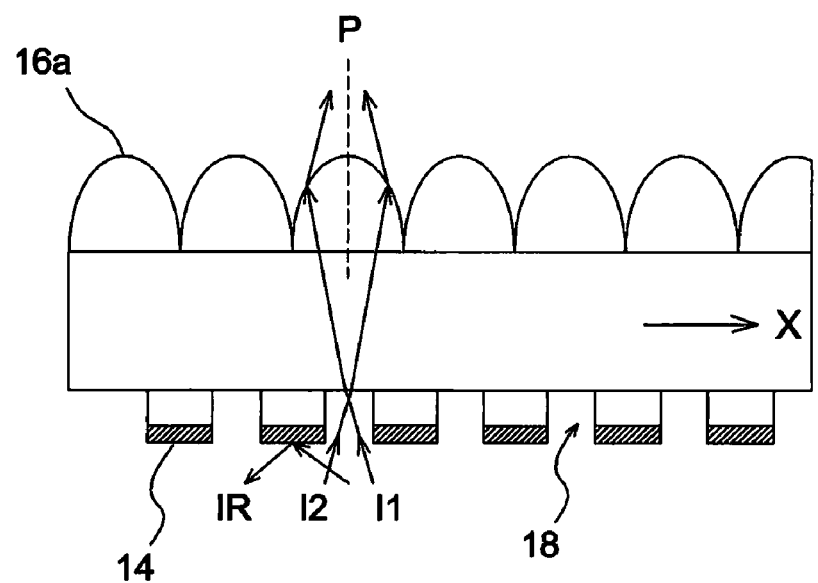
FIG. 4 shows an enlarged cross-section cut along line B-B' of FIG. 3.
Figure 5:
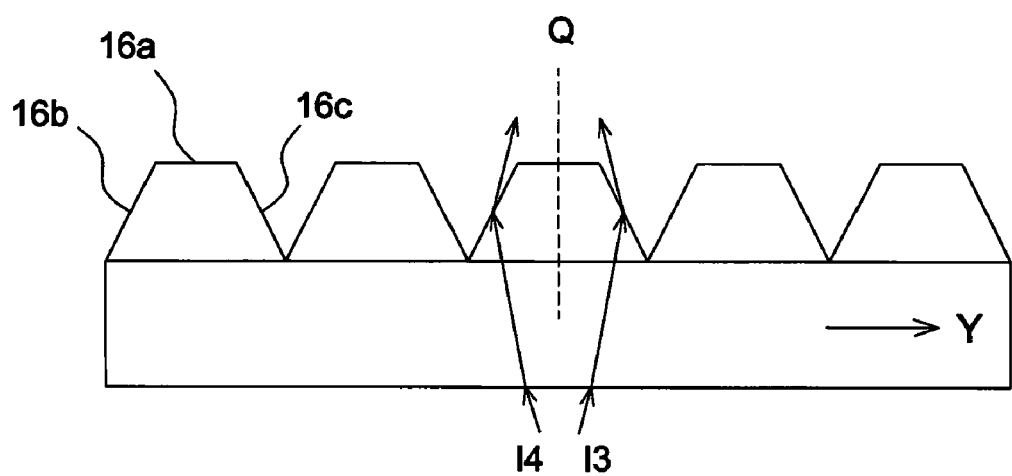
FIG. 5 shows an enlarged cross-section cut along line C-C' of FIG. 3 according to an embodiment of the present invention.

FIG. 3 shows a schematic diagram illustrating a light-collimating film 10, FIG. 4 shows an enlarged cross-section cut along line B-B' of FIG. 3 according to an embodiment of the present invention, and FIG. 5 shows an enlarged cross-section cut along line C-C' of FIG. 3. Referring to FIG. 3, the light-collimating film 10 includes a transparent substrate 12 and characteristic optical structures formed on the transparent substrate 12. The transparent substrate 12 has a light incident surface 12a and a light-emitting surface 12b opposite the light incident surface 12a. The characteristic optical structures include, for instance, a plurality of reflective elements 14 formed on the light incident surface 12a and a plurality of prismatic micro structures 16 formed on the light-emitting surface 12b.

The reflective elements 14 are formed on the light incident surface 12a, and each reflective element 14 extends in a Y-axis direction to have a stripe shape. Hence, a longitudinal aperture 18 is defined by two adjacent reflective elements 14, with each longitudinal aperture 18 extending in the Y-axis direction on the light incident surface 12a and the longitudinal axes of the longitudinal apertures 18 being parallel to each other. In one embodiment, each reflective element 14 includes a pillar portion 14a formed on the light incident surface 12a and a white reflective film 14b formed on the surface of the pillar portion 14a, and the white reflective film 14b is composed of MgO or TiO2 powders.

A plurality of prismatic micro structures 16 are arranged parallel to the longitudinal axes of the longitudinal apertures 18 (Y-axis direction) on the light-emitting surface 12b and overlap the longitudinal apertures 18 to form a plurality of rows of prismatic micro structures. Referring to both FIG. 4 and FIG. 5, in this embodiment, each prismatic micro structure 16 is a lenticular lens. The lenticular lens has a cylindrical side surface 16a, a first inclined plane 16b, and a second inclined plane 16c. The cylindrical side surface 16a extends parallel to the longitudinal axis of the longitudinal aperture 18, and the first and the second inclined planes 16b and 16c that are connected with two sides of the cylindrical side surface 16a lean toward the center of a lenticular lens. When emitting light beams of a backlight source (not shown) incident on the light-collimating film 10 at different angles, some light beam (such as a light beam IR) having a comparatively large incident angle is reflected by the reflective elements 14 and then return to the backlight source to be recycled, and some light beams (such as light beams I1-I4) passing through the longitudinal aperture 18 are deflected by prismatic micro structures 16 and then guided to an on-axis viewing direction (normal direction) of the light-collimating film 10. More specifically, as shown in FIG. 4, the cylindrical side surface 16a of each prismatic micro structure 16 is allowed to deflect the incident light beams I1 and I2 that pass through the longitudinal aperture 18 toward a virtual central plane P of the prismatic micro structure 16 which equally divides the prismatic micro structure 16 and is parallel to the longitudinal axis of the longitudinal aperture 18. Besides, as shown in FIG. 5, the inclined planes 16b and 16c of each prismatic micro structure 16 facing to each other are allowed to deflect the incident light beams I3 and I4 that pass through the longitudinal aperture 18 toward a virtual central plane Q of the prismatic micro structure 16 which equally divides the prismatic micro structure 16 and is perpendicular to the longitudinal axis of the longitudinal aperture 18. In other words, since an azimuth difference of about 90 degrees exists between the orientation of a first side portion (cylindrical side surface 16a) and the orientation of a second side portion (inclined planes 16b and 16c), the light-emitting angle of the light-collimating film is narrowed in both directions that are perpendicular to each other as the light beams are deflected by the first and the second side portions. Under the circumstance, the collimation effect and brightness performance of the light-collimating film 10 are considerably enhanced.

Figure 6:
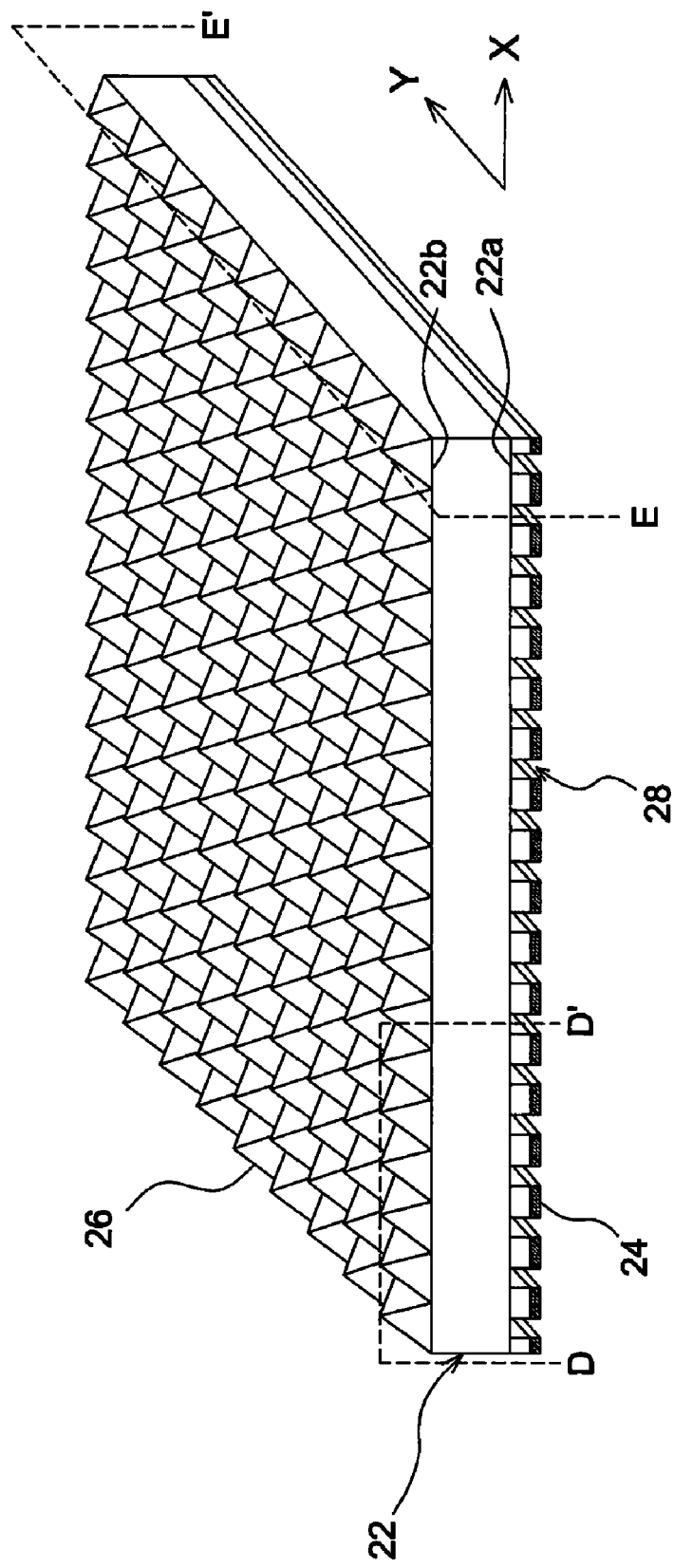
FIG. 6 shows a schematic diagram illustrating another light-collimating film.
Figure 7:
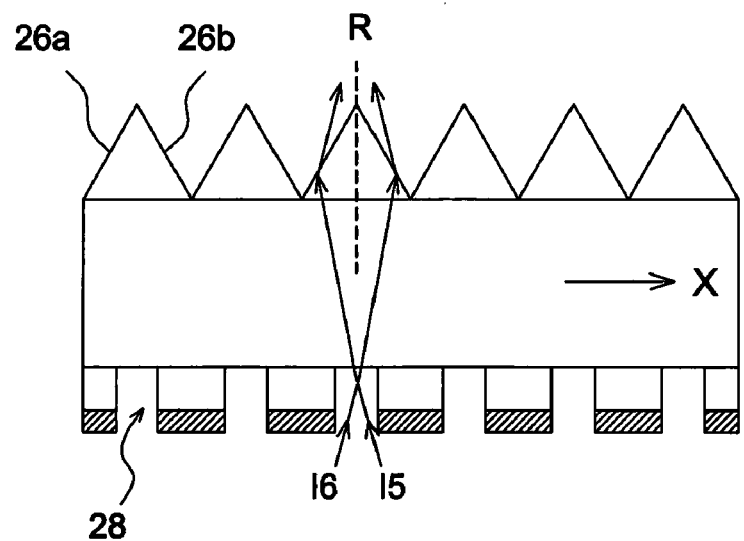
FIG. 7 shows an enlarged cross-section cut along line D-D' of FIG. 6.
Figure 8:
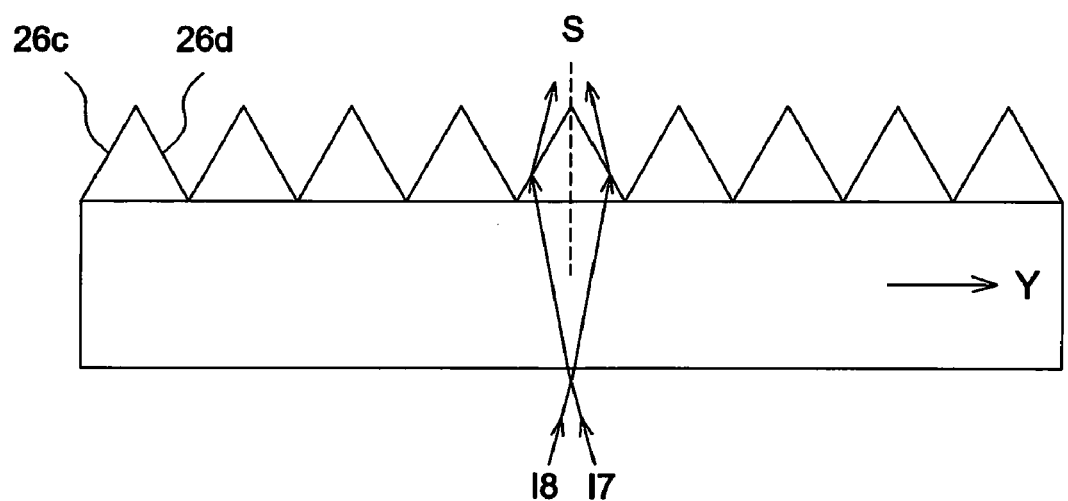
FIG. 8 shows an enlarged cross-section cut along line E-E' of FIG. 6 according to an embodiment of the present invention.

FIG. 6 shows a schematic diagram illustrating another light-collimating film 20 according to an embodiment of the present invention, FIG. 7 shows an enlarged cross-section cut along line D-D' of FIG. 6, and FIG. 8 shows an enlarged cross-section cut along line E-E' of FIG. 6. As shown in FIG. 6, a plurality of prismatic micro structures 26 are arranged parallel to the longitudinal axes of longitudinal apertures 28 on the light-emitting surface 22b and overlap the longitudinal apertures 28 to form a plurality of rows of prismatic structures. Referring to both FIG. 7 and FIG. 8, in this embodiment, each prismatic micro structure 26 is a rectangular pyramid. The rectangular pyramid has two inclined planes 26a and 26b that face to each other, extend parallel to the longitudinal axis of the longitudinal aperture 28, and lean toward the center of the rectangular pyramid. Besides, the rectangular pyramid has two second inclined planes 26c and 26d that face to each other, extend perpendicular to the longitudinal axis of the longitudinal aperture 28, and lean toward the center of the rectangular pyramid. Hence, as shown in FIG. 7, in this embodiment the inclined planes 26a and 26b facing to each other of each prismatic micro structure 26 is allowed to deflect incident light beams I5 and I6 that pass through the longitudinal aperture 28 toward a virtual central plane R of the prismatic micro structure 26 which equally divides the prismatic micro structure 26 and is parallel to the longitudinal axis of the longitudinal aperture 28. Besides, as shown in FIG. 8, the inclined planes 26c and 26d facing to each other of each prismatic micro structure 26 are allowed to deflect incident light beams I7 and I8 that pass through the longitudinal aperture 28 toward a virtual central plane S of the micro structure 26 which equally divides the prismatic micro structure 26 and is perpendicular to the longitudinal axis of the longitudinal aperture 28. Hence, since an azimuth difference of about 90 degrees exists between the orientation of a first side portion (inclined planes 26a and 26b) and that of a second side portion (inclined planes 26c and 26d), the light-emitting angles of the light-collimating film are narrowed in both directions that are perpendicular to each other as the light beams are deflected by the first and the second side portions. Under the circumstance, the collimation effect and brightness performance of the light-collimating film 20 are considerably enhanced.

Figure 9:
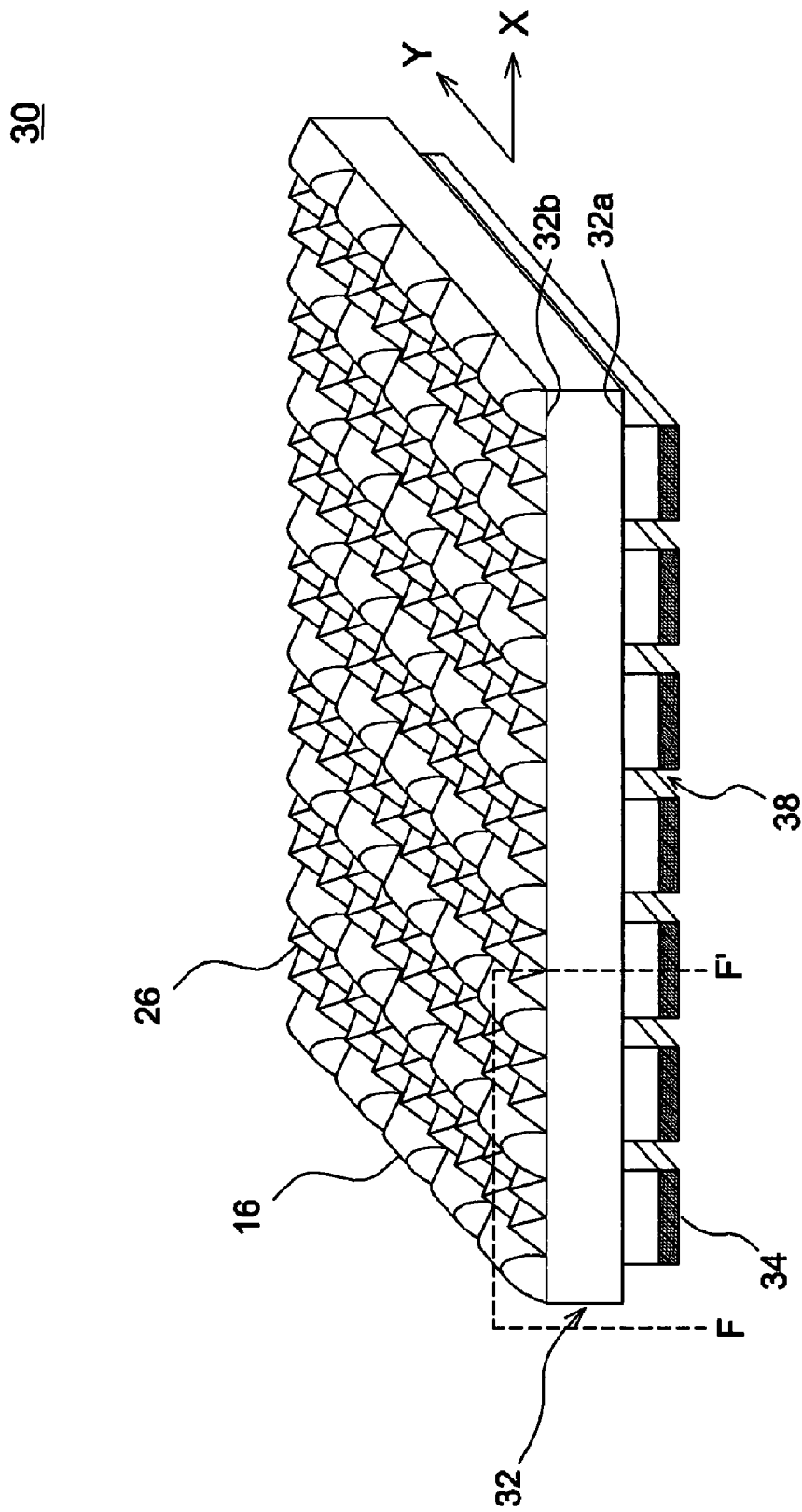
FIG. 9 shows a schematic diagram illustrating another light-collimating film.
Figure 10:
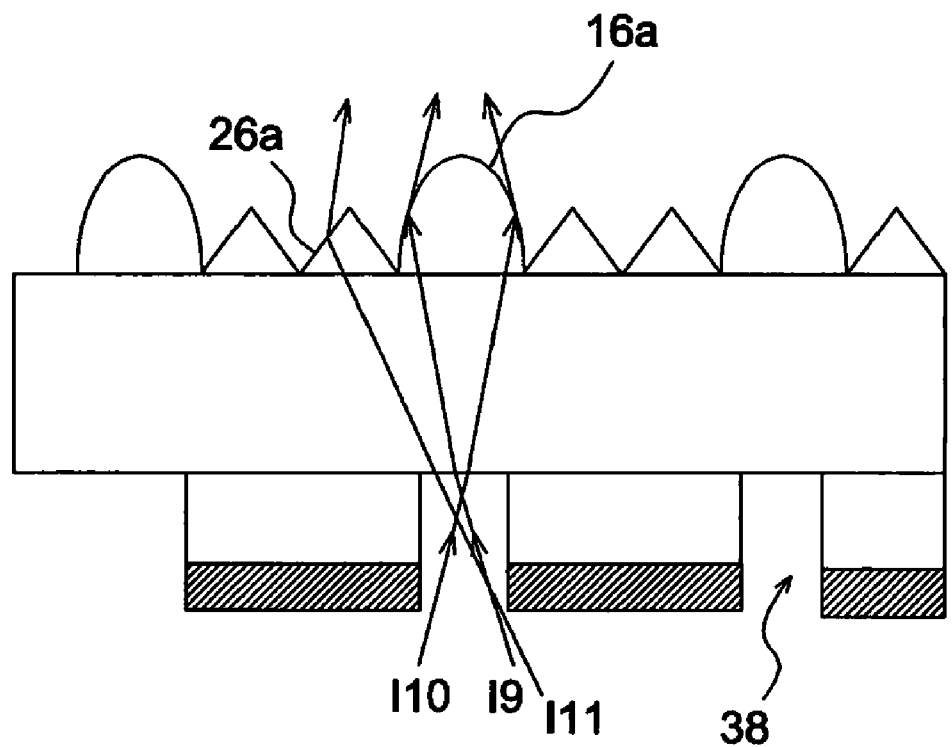
FIG. 10 shows an enlarged cross-section cut along line F-F' of FIG. 9 according to an embodiment of the present invention.
Figure 11:
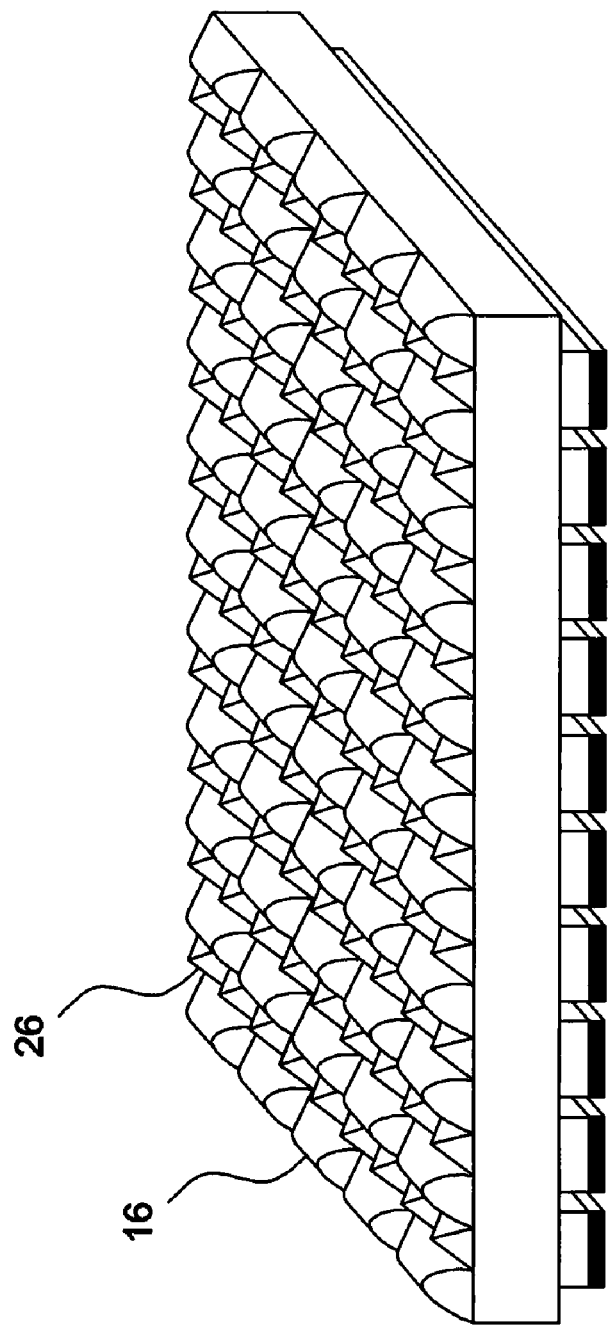
FIG. 11 shows a schematic diagram illustrating another light-collimating film according to an embodiment of the present invention.

FIG. 9 shows a schematic diagram illustrating another light-collimating film 30 according to an embodiment of the present invention, and FIG. 10 shows an enlarged cross-section cut along line F-F' of FIG. 9. Referring to FIG. 9, a plurality of reflective elements 34 are formed on the light incident surface 32a of a transparent substrate 32, and the characteristic optical structures formed on the light-emitting surface 32b includes a plurality of first prismatic structures 16 and a plurality of second prismatic structures 26. The first prismatic structures 16 are arranged parallel to the longitudinal axes of a longitudinal apertures 38 (Y-axis direction) on the light-emitting surface 32b and overlap the longitudinal apertures 38 to form a plurality of rows of first prismatic micro structures. Similarly, the second prismatic structures 26 are arranged parallel to the longitudinal axes of the longitudinal apertures 38 (Y-axis direction) on the light-emitting surface 32b and overlap the longitudinal apertures 38 to form a plurality of rows of second prismatic micro structures. In this embodiment, each first prismatic micro structure 16 is a lenticular lens, and each second prismatic micro structure 26 is a rectangular pyramid. Each row of first prismatic micro structures and each row of second prismatic micro structures are parallel to the longitudinal axis of the longitudinal aperture 38, and two rows of second prismatic micro structures are positioned between each two rows of first prismatic micro structures. Referring to FIG. 10, the cylindrical side surface 16a of each lenticular lens is allowed to deflect incident light beams I9 and I10 that pass the longitudinal aperture 38 to the on-axis viewing direction (normal direction) of the light-collimating film 30, and the inclined plane 26a of each rectangular pyramid is allowed to deflect incident light beam I11 that has a comparatively large incident angle to the on-axis viewing direction (normal direction) of the light-collimating film 30 so as to further enhance the light collimation effect. Besides, the arrangement of the rows of first and second prismatic micro structures is not limited. For example, as shown in FIG. 11, in the light collimating film 40 only one row of second prismatic micro structures is positioned between each two rows of first prismatic micro structures.

Figure 12:
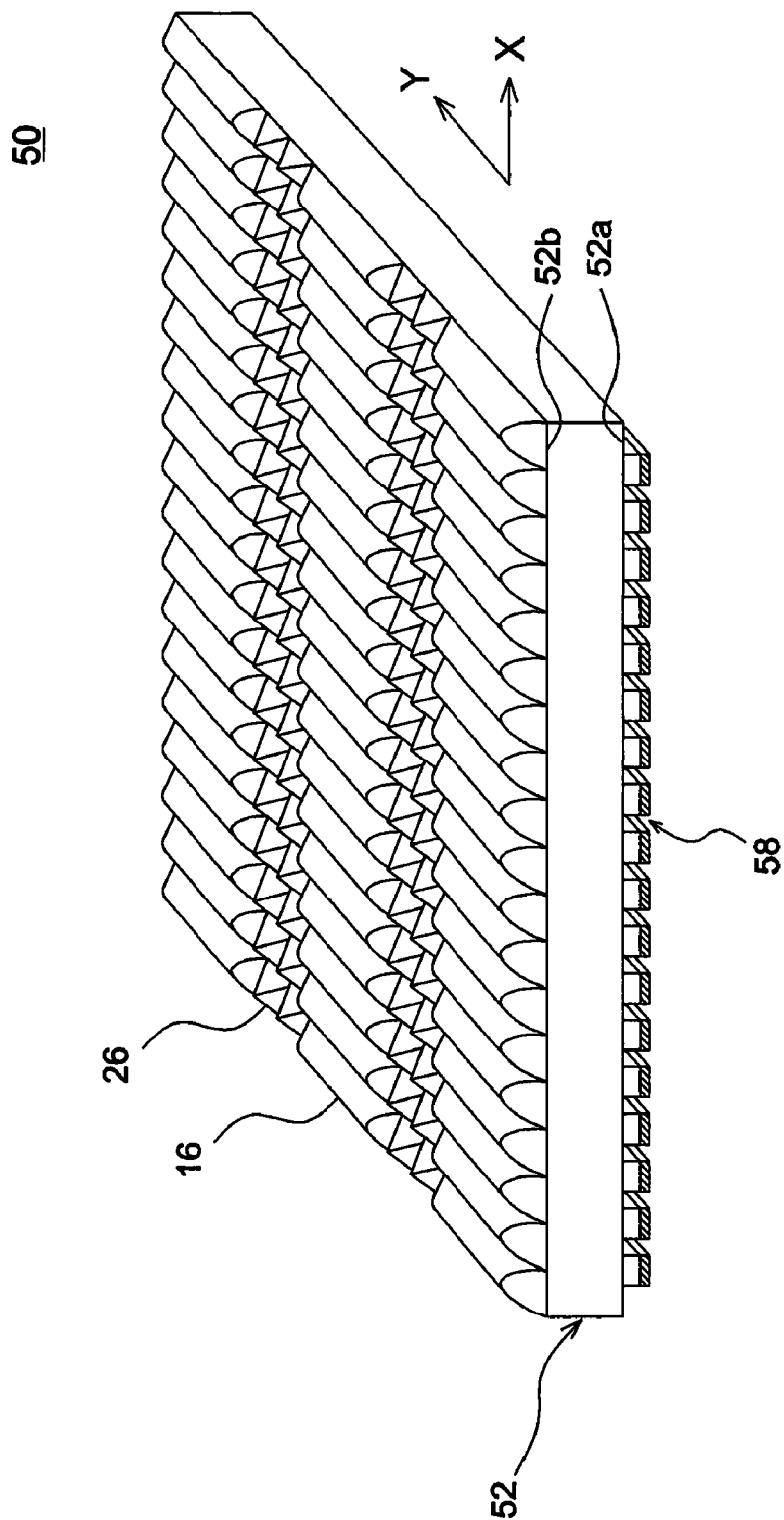
FIG. 12 shows a schematic diagram illustrating another light-collimating film according to an embodiment of the present invention.
Figure 13:
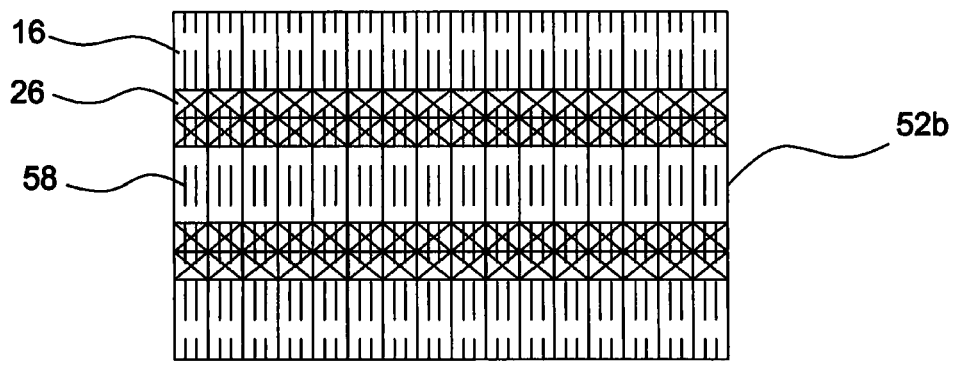
FIGS. 13-15 show schematic diagrams illustrating the arrangement of second prismatic structures.
Figure 14:
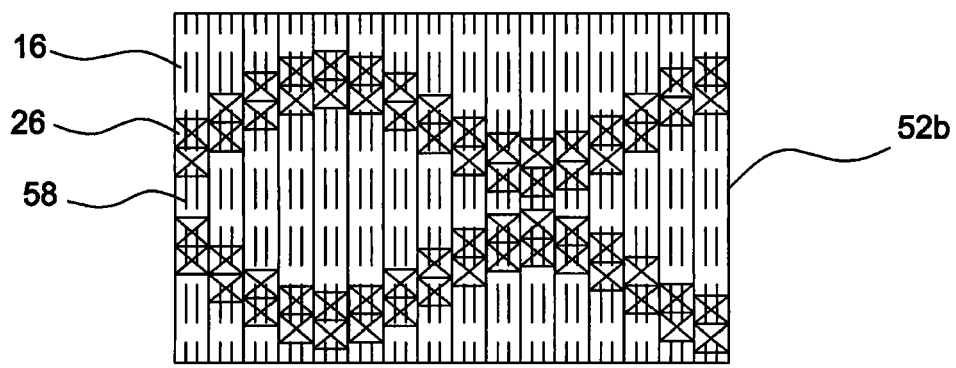
Figure 15:
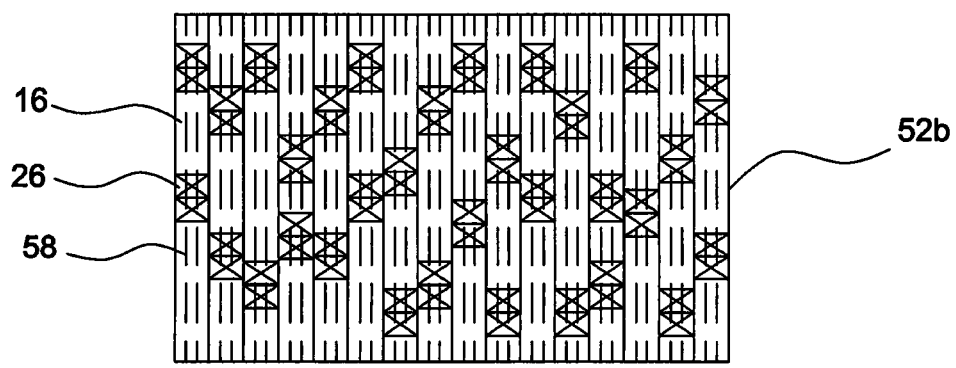

FIG. 12 shows a schematic diagram illustrating another light-collimating film 50 according to an embodiment of the present invention. Referring to FIG. 12, the characteristic optical structures formed on the light-emitting surface 52b of a transparent substrate 52 includes a plurality of first prismatic micro structures 16 and a plurality of second prismatic micro structures 26. In this embodiment, each first prismatic micro structure 16 is a lenticular lens, and each second prismatic structure is a rectangular pyramid. The first prismatic micro structures 16 are arranged parallel to the longitudinal axes of a longitudinal apertures 58 (Y-axis direction) on the light-emitting surface 52b and overlap the longitudinal apertures 58 to form a plurality of rows of first prismatic micro structures. Further, two adjacent first prismatic micro structures in the same row are spaced apart from each other, and a plurality of second prismatic micro structures are provided in the spaces formed between each two adjacent first prismatic micro structures in the same row and overlap the longitudinal apertures 58 to form a plurality of rows of second prismatic micro structures, with each row of second prismatic micro structures perpendicular to the longitudinal axes of the longitudinal apertures 58. Certainly, in this embodiment, the arrangement of second prismatic micro structures 26 (such as rectangular pyramids) positioned between each two adjacent first prismatic micro structures 16 (such as lenticular lenses) is not limited. Referring to FIGS. 13 to 15 where the forming positions of longitudinal apertures 58 are indicated by dash lines, the second prismatic structures 26 on the light-emitting surface 52b may be regularly arranged into a plurality of rows (FIG. 13), arranged along arc lines (FIG. 14), or irregularly arranged (FIG. 15).

Figure 16A:
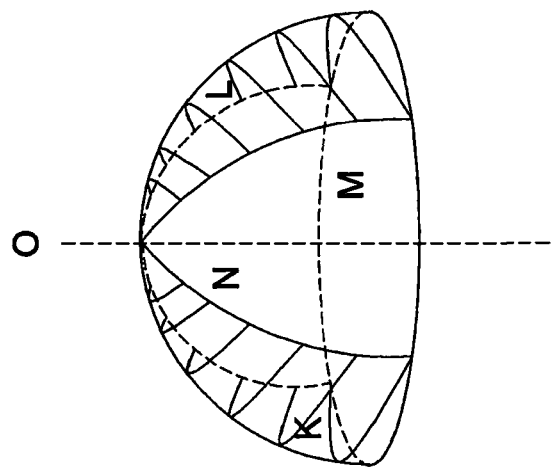
FIG. 16A shows a schematic diagram illustrating another prismatic structure.
Figure 16B:
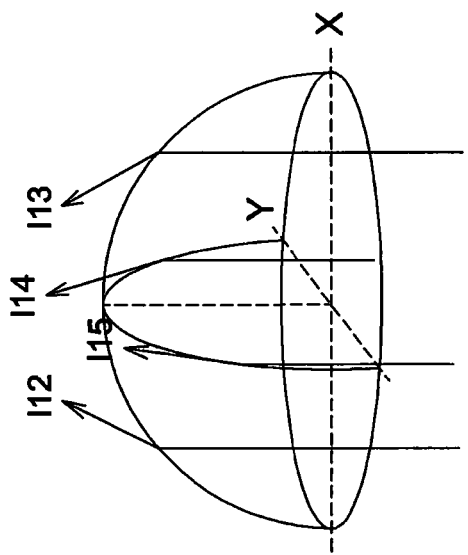
FIG. 16B shows the light deflecting effect of the prismatic structure shown in FIG. 16A according to an embodiment of the present invention.
Figure 17:
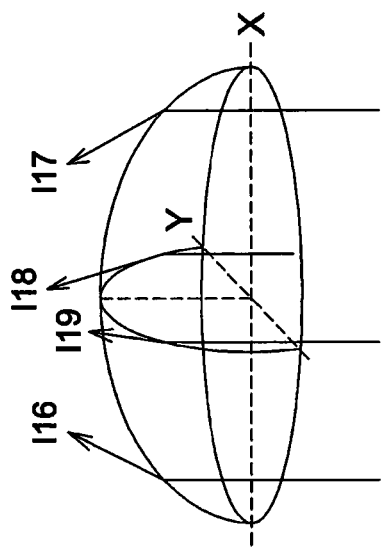
FIG. 17 shows a schematic diagram illustrating another prismatic structure according to an embodiment of the present invention.

Note that, in all the above embodiments, the characteristic optical structures formed on a light-collimating film are exemplified as lenticular lenses and rectangular pyramids, but this not limited. As long as an azimuth difference exists between the orientations of different side portions of a characteristic optical structure and the side portions are capable of deflecting light, the light-emitting angle of the light-collimating film is allowed to be narrowed in both directions that are perpendicular to each other. For example, as shown in FIGS. 16A and 16B, the prismatic micro structure is a semi-sphere 62, and the arc surface of the semi-sphere 62 is divided into a first side portion and a second side portion that are different in azimuth. The first side portion includes a first curved surface K and a second curved surface L facing to each other and bend toward a center axis O, and the second side portion includes a third curved surface M and a fourth curved surface N facing to each other and bend toward the center axis O. The curved surfaces K, L, M and N respectively deflect light beams I12, I13, I14 and I15 to the on-axis viewing direction (normal direction) of a light-collimating film to narrow its light-emitting angle in different directions. Alternatively, as shown in FIG. 17, the prismatic structure is a semi-ellipsoid 64, and the curved surfaces of the semi-ellipsoid 64 respectively deflect light beams I16, I17, I18 and I19 to the on-axis viewing direction (normal direction) of a light-collimating film to narrow its light-emitting angle in different directions.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light-collimating film, comprising:
   a transparent substrate having a light incident surface and a light-emitting surface opposite the light incident surface;
   a plurality of reflective elements formed on the light incident surface, wherein each two adjacent reflective elements define a longitudinal aperture, and longitudinal axes of the longitudinal apertures are parallel to each other;
   a plurality of micro structures arranged on the light-emitting surface in a direction parallel to the longitudinal axes of the longitudinal apertures and overlapping the longitudinal apertures to form a plurality of rows of micro structures, wherein each of the micro structures comprises:
   a first side portion that is allowed to deflect a first light beam incident thereon toward a first virtual central plane of the micro structure which equally divides the micro structure;
   a second side portion that is allowed to deflect a second light beam incident thereon toward a second virtual central plane of the micro structure, with the second virtual central plane being substantially perpendicular to the longitudinal axis of the longitudinal aperture.

2. The light-collimating film as claimed in claim 1, wherein the first virtual central plane is substantially parallel to the longitudinal axis of the longitudinal aperture.

3. The light-collimating film as claimed in claim 1, wherein the first side portion comprises a cylindrical side surface extending parallel to the longitudinal axis, and the second side portion comprises a first and a second inclined planes that are connected with two sides of the cylindrical side surface and lean toward the second virtual central plane.

4. The light-collimating film as claimed in claim 3, wherein each of the micro structures comprises a lenticular lens.

5. The light-collimating film as claimed in claim 1, wherein the first side portion comprises a first and a second inclined planes that face to each other and lean toward the first virtual central plane, and the second side portion comprises a third and a fourth inclined planes that face to each other and lean toward the second virtual central plane.

6. The light-collimating film as claimed in claim 5, wherein each of the micro structures comprises a rectangular pyramid.

7. The light-collimating film as claimed in claim 1, wherein the first side portion comprises a first and a second curved surfaces that face to each other and lean toward the first virtual central plane, and the second side portion comprises a third and a fourth curved surfaces that face to each other and lean toward the second virtual central plane.

8. The light-collimating film as claimed in claim 7, wherein each of the micro structures comprises a semi-sphere or a semi-ellipsoid.

9. The light-collimating film as claimed in claim 1, wherein each of the reflective elements comprises a pillar portion formed on the light incident surface and a white reflective film formed on a surface of the pillar portion.

10. The light-collimating film as claimed in claim 9, wherein the white reflective film is composed of MgO or TiO2 powders.

11. A light-collimating film, comprising:
a transparent substrate having a light incident surface and a light-emitting surface opposite the light incident surface;
a plurality of reflective elements formed on the light incident surface, wherein each two adjacent reflective elements define a longitudinal aperture, and longitudinal axes of the longitudinal apertures are parallel to each other;
a plurality of first micro structures arranged on the light-emitting surface in a direction parallel to the longitudinal axes of the longitudinal apertures and overlapping the longitudinal apertures to form a plurality of rows of first micro structures, wherein each of the first micro structures comprises:
a first side portion that is allowed to deflect a first light beam incident thereon toward a first virtual central plane of the first micro structure which equally divides the first micro structure; and
a second side portion that is allowed to deflect a second light beam incident thereon toward a second virtual central plane of the micro structure, with the second virtual central plane being substantially perpendicular to the longitudinal axis of the longitudinal aperture; and
a plurality of second micro structures that are different to the first micro structures in shape, wherein each of the second micro structures is arranged between two first micro structures and comprises:
a third side portion that is allowed to deflect a third light beam incident thereon toward a third virtual central plane of the second micro structure which equally divides the second micro structure; and
a fourth side portion that is allowed to deflect a fourth light beam incident thereon toward a fourth virtual central plane of the second micro structure, with the fourth virtual central plane being substantially perpendicular to the longitudinal axis of the longitudinal aperture.

12. The light-collimating film as claimed in claim 11, wherein the first virtual central plane and the third virtual central plane are substantially parallel to the longitudinal axes of the longitudinal apertures.

13. The light-collimating film as claimed in claim 11, wherein the second micro structures are arranged on the light-emitting surface in a direction parallel to the longitudinal axes of the longitudinal apertures and overlap the longitudinal apertures to form a plurality of rows of second micro structures, and at least one row of second micro structures is positioned between two adjacent rows of first micro structures.

14. The light-collimating film as claimed in claim 11, wherein each of the second micro structures is positioned between two first micro structures of one of the rows of first micro structures, and the second micro structures are formed on the light-emitting surface and overlap the longitudinal apertures.

15. The light-collimating film as claimed in claim 14, wherein the second micro structures are arranged on the light-emitting surface to form a plurality of rows of second micro structures that are substantially perpendicular to the longitudinal axes of the longitudinal apertures.

16. The light-collimating film as claimed in claim 14, wherein the second micro structures are irregularly arranged on the light-emitting surface.

17. The light-collimating film as claimed in claim 11, wherein the first side portion comprises a cylindrical side surface extending parallel to the longitudinal axis, and the second side portion comprises a first and a second inclined planes that are connected with two sides of the cylindrical side surface and lean toward the second virtual central plane.

18. The light-collimating film as claimed in claim 17, wherein each of the first micro structures comprises a lenticular lens.

19. The light-collimating film as claimed in claim 17, wherein the third side portion comprises a third and a fourth inclined planes that face to each other and lean toward the third virtual central plane, and the fourth side portion comprises a fifth and a sixth inclined planes that face to each other and lean toward the fourth virtual central plane.

20. The light-collimating film as claimed in claim 19, wherein each of the second micro structures comprises a rectangular pyramid.

21. The light-collimating film as claimed in claim 17, wherein the third side portion comprises a first and a second curved surfaces that face to each other and lean toward the third virtual central plane, and the fourth side portion comprises a third and a fourth curved surfaces that face to each other and lean toward the fourth virtual central plane.

22. The light-collimating film as claimed in claim 21, wherein each of the second micro structures comprises a semi-sphere or a semi-ellipsoid.

* * * * *